United States Patent [19]

Lin

[11] Patent Number: 5,397,466
[45] Date of Patent: Mar. 14, 1995

[54] CIRCULATING FILTER AND AERATOR SYSTEM FOR USE IN AQUACULTURE

[75] Inventor: Victor J. Lin, Lancaster, Ohio

[73] Assignee: Mytrex Industries, Inc., Taipei, Taiwan, Prov. of China

[21] Appl. No.: 79,635

[22] Filed: Jun. 18, 1993

[51] Int. Cl.6 .............................................. A01K 63/04
[52] U.S. Cl. .................................. 210/170; 210/221.1; 210/242.1; 210/242.2; 210/169; 119/226
[58] Field of Search ...................... 210/169, 170, 242.1, 210/242.2, 220, 221.1, 221.2; 119/206, 211, 226, 232, 261; 261/93

[56] References Cited

U.S. PATENT DOCUMENTS

| | | | |
|---|---|---|---|
| 1,909,578 | 5/1933 | Franke | 210/242.1 |
| 2,825,541 | 3/1958 | Moll et al. | 261/93 |
| 2,871,820 | 2/1959 | Hayden | 119/261 |
| 3,189,334 | 6/1965 | Bell | 261/93 |
| 3,496,901 | 2/1970 | Stanfield et al. | 210/242.2 |
| 3,717,123 | 2/1973 | Regnier | 119/226 |
| 3,760,767 | 9/1973 | Hickey | 119/232 |
| 3,886,902 | 6/1975 | Haynes | 119/3 |
| 3,994,807 | 11/1976 | Macklem | 119/261 |
| 4,030,859 | 6/1977 | Henegar | 210/242.2 |
| 4,043,299 | 8/1977 | Birkbeck et al. | 119/3 |
| 4,052,960 | 10/1977 | Birkbeck et al. | 119/3 |
| 4,271,099 | 6/1981 | Kukla | 210/169 |
| 4,587,064 | 5/1986 | Blum | 210/242.2 |
| 4,654,147 | 3/1987 | Bagley | 210/170 |
| 4,853,124 | 8/1989 | Terada | 210/242.2 |
| 4,861,465 | 8/1989 | Augustyniak | 210/169 |
| 4,894,149 | 1/1990 | Block | 210/169 |
| 4,906,359 | 3/1990 | Cox, Jr. | 210/242.2 |
| 5,062,951 | 11/1991 | Tominaga | 210/169 |
| 5,081,954 | 1/1992 | Monus | 119/3 |
| 5,122,266 | 6/1992 | Kent | 210/242.2 |
| 5,139,659 | 8/1992 | Scott | 119/261 |
| 5,205,237 | 4/1993 | Skeggs et al. | 119/226 |
| 5,275,123 | 1/1994 | Geung | 119/226 |
| 5,320,068 | 6/1994 | Redditt | 210/170 |
| 5,336,399 | 8/1994 | Kajisono | 210/242.2 |

FOREIGN PATENT DOCUMENTS 3194707  8/1988  Japan .................... 210/242.2

Primary Examiner—Cynthia L. Nessler
Attorney, Agent, or Firm—Darby & Darby

[57] ABSTRACT

A circulating filter and aerator system is to be installed in a pond of an aquaculture system and includes a pump unit which draws water from the pond and which is adapted to float and extend into the pond at a desired depth, a filter unit with an inlet port and an outlet port, a first control valve which connects the pump unit and the inlet port of the filter unit and which controls water flow from the pump unit to the filter unit, a floating aerator unit which receives filtered water from the filter unit and which generates sprays of the filtered water to release harmful gas and to reintroduce oxygen into the pond, serially connected second and third control valves which connect the outlet port of the filter unit and the floating aerator unit and which control water flow from the filter unit to the floating aerator unit, a fourth control valve which is provided on the filter unit to permit release of air in the filter unit when water fills the filter unit, a fifth control valve which is provided between the outlet port of the filter unit and the pump unit, and a sixth control valve which is provided between the first control valve and the inlet port of the filter unit.

6 Claims, 3 Drawing Sheets

CIRCULATING FILTER AND AERATOR SYSTEM FOR USE IN AQUACULTURE

BACKGROUND OF THE INVENTION

1. Field of the Invention

The invention relates to a circulating filter and aerator system for use in aquaculture, more particularly to a filter and aerator system which is capable of maintaining the water and soil qualities and which can overcome the drawbacks commonly encountered with the use of underground water sources, such as the use of an excess amount of water to dilute the polluted water and to discharge the same to a clean water source.

2. Description of the Related Art

In a conventional aquaculture system, water from an underground water source is pumped into a pond. A vaned water mill serves as an aerator and is used to introduce air into the water in the pond. In order to prevent the spread of disease, treatment agents are poured into the pond so as to control the growth of plankton and parasites. The main drawbacks of the conventional aquaculture system are as follows:

1. Continuous drawing of water from the underground water source can cause severe environmental damage, such as sinking of the ground, because the amount of water drawn is more than that which can be supplied naturally to the underground water source.

2. Although the vaned water mill can introduce air into the water in the pond, the water mill cannot control the growth Of plankton thereat, thereby resulting in the spread of diseases in the latter.

3. Long term use of treatment agents will not only seriously pollute the water and soil of the aquaculture system, but will also result in immunity from disease causing sources.

In the daily operation of the conventional aquaculture system, an excess amount of water is pumped from the underground source to dilute the water in the pond. This is necessary because the quality of water in the pond gets worse as a result of the accumulation of unused food and excretion by shrimps, fish or other marine animals. Even with the overflow of excess water in order to dilute the polluted water, there is still a need to clean and dry the bottom of the pond after completion of a breeding cycle. When cleaning the bottom of the pond, all of the water in the pond is removed in order to expose the bottom of the pond to the sun so as to decontaminate the same. Soil in the pond bottom is upturned and is exposed to the sunlight, and treatment agents may be added to decompose the waste collected in the soil, before water is pumped back into the pond. Thus, cleaning of the pond bottom requires a lot of time, normally a month or longer, and manpower, thereby resulting in financial loss to the operator of the conventional aquaculture system.

SUMMARY OF THE INVENTION

The objective of the present invention is to provide a circulating filter and aerator system which is capable of maintaining the water and soil qualities in a pond of the aquaculture system and which can overcome the drawbacks commonly encountered with the use of underground water sources.

The filter portion of the system of the present invention controls the growth of proper amounts of plankton, algae and other contaminants in the water. The aerator portion of the system of the present invention sprays the water .into the air, removes harmful gases, oxygenates the water, and increases the amount of beneficial aerobic bacteria in the water and soil of the pond. This is accomplished with the residual power from the filter portion of the system. The return of the sprayed water into the pond completes the water circulation cycle.

Accordingly, the circulating filter and aerator system of the present invention is to be installed in a pond of an aquaculture system and comprises a pump unit which draws water from the pond and which is adapted to float on the pond at a desired position and extend into the pond at a desired depth, a filter unit with an inlet port and an outlet port, a first control valve which connects the pump unit and the inlet port of the filter unit and which controls water flow from the pump unit to the filter unit, and a floating aerator unit which receives filtered water from the filter unit and which generates sprays of the filtered water to release harmful gas, such as ammonia or hydrogen sulfide, depending upon the circumstances. The sprays of filtered water absorb oxygen from the air before reentering the pond. The system of the present invention further comprises serially connected second and third control valves, which connect the outlet port of the filter unit and the floating aerator unit and which control water flow from the filter unit to the floating aerator unit, a fourth control valve, which is provided on the filter unit to permit release of air in the filter unit when water fills the filter unit, a fifth control valve, which is provided between the outlet port of the filter unit and the pump unit, and a sixth control valve, which is provided between the first control valve and the inlet port of the filter unit.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
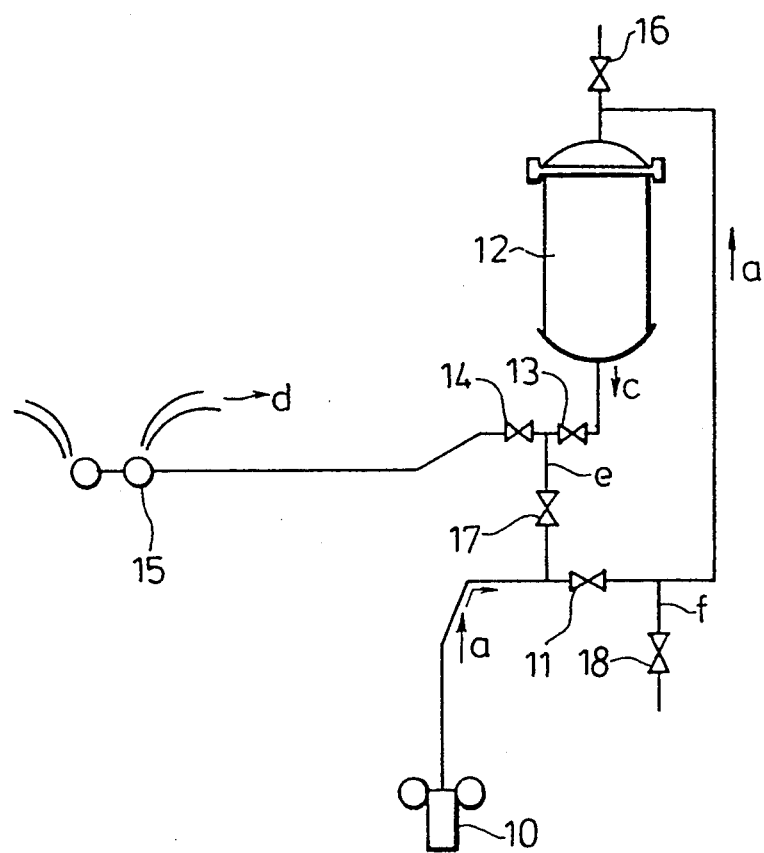
FIG. 1 is a schematic flow diagram of the first preferred embodiment of a circulating filter and aerator system according to the present invention.

Referring to FIG. 1, the first preferred embodiment of a circulating filter and aerator system according to the present invention is shown to comprise a pump unit 10, a filter unit 12 and a floating aerator unit 15. The pump unit 10 is adapted to afloat on the water surface at a desired position and can be extended into the pond of an aquaculture system at a desired depth. A first control valve 11 connects the pump unit 10 and the filter unit 12. The pump unit 10 draws dirty water (a) from the pond and provides the same to the filter unit 12. Second and third control valves 13, 14 are connected serially and permit the flow of filtered water (c) from the filter unit 12 to the floating aerator unit 15. The floating aerator unit 15 provides sprays (d) of filtered water to release harmful gas. The sprays (d) absorb oxygen in the air before returning to the pond. The filter unit 12 is provided with a fourth control valve 16 which permits the release of air in the filter unit 12 when water fills the latter during operation. The pump unit 10, the first control valve 11, the filter unit 12, the second control valve 13 and the third control valve 14 cooperate to form a water path (e). A fifth control valve 17 is provided on the water path (e), preferably between an outlet port of the filter unit 12 and the pump unit 10. In this embodiment, the fifth control valve 17 serves as a by-pass and connects the junction of the second and third control valves 13, 14 and the pump unit 10. A discharge path (f) is provided between the first control valve 11 and an inlet port of the filter unit 12. A sixth control valve 18 is provided on the discharge path (f).

In this embodiment, the position of the pump unit 10 can be adjusted so as to permit drawing of water from different parts of the pond. The pump unit 10 includes a water-resistant motor (not shown) and a float means (not shown) attached to the motor in order to permit the latter to float at a desired position and at a desired depth in the pond.

Figure 2:
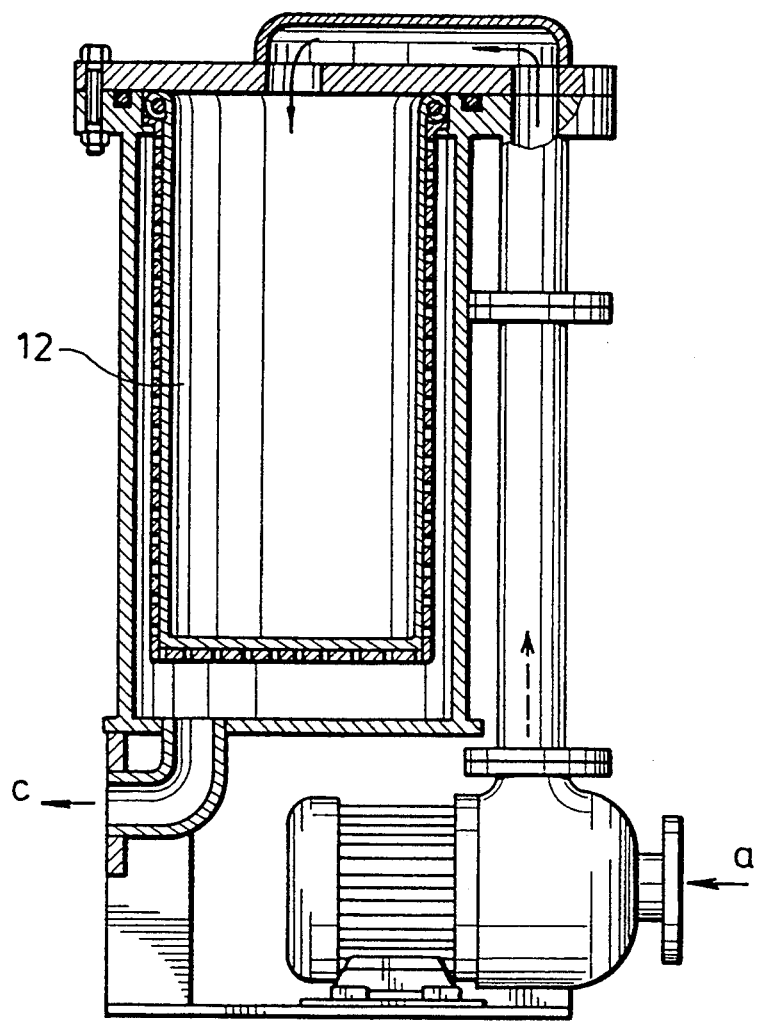
FIG. 2 is a sectional view of a filter unit of the first preferred embodiment.

Referring to FIG. 2, the filter unit 12 includes a filter housing that contains a filter bag and is made of ultraviolet ray-resistant and salt water-proof plastic, such as FRP or PVC. The filter unit 12 may also be made of a non-corrosive alloy. The micron ratings of the filter bag material of the filter unit 12 can be standardized (such as 1, 3, 5, 10, 20, 50, 75, 100 micrometers) and is chosen so as to correspond with the effectivity in the removal of contaminates, such as plankton, algae and unused food, and so as to minimize pressure difference in order to attain the best filtering effect.

The filtered water (c) from the filter unit 12 is forged by the pressure from the pump unit 10 to flow to the floating aerator unit 15. Because the pump unit 10 is capable of drawing water from a deep part of the pond where the oxygen content may be lower, the oxygen content in the pond can be increased when the present invention is employed. In contrast, the vaned water mills used in conventional aquaculture systems operate only on the water surface of the pond. Since the surface water of the pond is nearly saturated, the resulting aerating efficiency is relatively low. Furthermore, a large part of the electric power consumed by the vaned water mills is converted into agitation of water in the pond. Therefore, the power efficiency of the vaned water mills is relatively low. In the present invention, the remaining energy of the filtered water is effectively used to generate sprays of filtered water at the floating aerator unit 15, thereby resulting in a relatively high power efficiency.

Note that the presence of an appropriate number of plankton in an aquaculture system is a must. However, the conventional aquaculture system has no means for preventing the growth of plankton to excessive levels, thereby resulting in the spread of disease therein. In the present invention, the growth of plankton is controlled to an equilibrium level, thereby providing the aquaculture system with the best living environment in order to promote rapid and healthy growth of shrimps or fish.

Aside from plankton, the presence of algae is also a must in an aquaculture system. However, if no means are employed to check the growth of algae, the water quality deteriorates rapidly, and the air content of the water is seriously affected. Thus, in the present invention, the pore size of the filter medium of the filter medium 12 should be chosen in order to check effectively the presence of algae in the aquaculture system.

The presence of microorganisms, fungi and the like in an aquaculture system is a must since they are responsible for the decomposition of uneaten food and dead plankton in the water. Harmful gas, such as ammonia or hydrogen sulfide, is generated when uneaten food and dead animals are decomposed by certain types of microorganisms. When plankton is filtered by the system of the present invention, some of the harmful microorganisms present are filtered therewith. However, the best way to control the spread of harmful microorganisms is to add specific aerobic bacteria or enzymes which are beneficial in digesting the harmful materials in the water and soil in the pond. Since the present invention is capable of removing some of the harmful microorganisms, addition of the specific innocuous aerobic bacteria or enzymes would greatly enhance the effectivity of the present invention in controlling the growth of the former.

In the present invention, there is no need to draw continuously water from an underground water source, thereby preventing the occurrence of severe environmental damage, such as sinking of the ground. Since the system of the present invention can improve dramatically the water and soil qualities in the aquaculture system, the excess dilution water requirement of the latter is greatly reduced, thereby permitting the water drawn thereby to be replaced naturally in the underground water source.

The circulating filter and aerator system of the present invention can be used to replace at least one of the vaned water mills used in conventional aquaculture systems. Although the electrical consumption of the present invention may be similar to that of one vaned water mill, the aerating efficiency of the former is greater than that of the latter. This is because the pump unit is capable of drawing dirty water from greater depress, wherein the oxygen content is less and the harmful gas content is higher. The present invention is also capable of reducing the harmful gas content in the water. Furthermore, the need for frequent replacement of water in the pond of the aquaculture system is greatly decreased with the use of the present invention.

If a bad weather condition, such as a low pressure front, occurs when the water and soil quality of the aquaculture system are poor, harmful gas, such as ammonia and hydrogen sulfide, are released from the soil to the water in the pond. The oxygen content of the water decreases simultaneously, thereby killing most of the shrimps or fish in the aquaculture system.

In the present invention, the soil quality in the aquaculture system can be improved by increasing the oxygen content therein. A larger oxygen content favors the growth of aerobic bacteria which is responsible for the decomposition of excretion and uneaten food at the bottom of the pond, thereby resulting in an improved living condition which favors the healthy and rapid growth of fish and other cultivated aquatic animals.

Note that in the present invention, the amount of treatment agents required is reduced, thereby lowering the costs incurred by the operator of the aquaculture system. In the conventional aquaculture system, treatment agents are added to control the spread of plankton and parasites. Addition of too much treatment agents may cause pollution and may result in the immunization of plankton and parasites thereto due to prolonged use of the treatment agents.

Referring once more to FIG. 1, when the first control valve 11, the third control valve 14 and the fourth control valve 16 are closed, while the fifth control valve 17, the second control valve 13 and the sixth control valve 18 are maintained open, water from the pump unit 10 passes through the fifth control valve 17 and the second control valve 13 and enters the filter unit 12 so as to rinse the latter, thereby backwashing dirty filtrate from the filter unit 12. This illustrates how cleaning of the filter unit 12 by backwashing can be effected.

Figure 3:
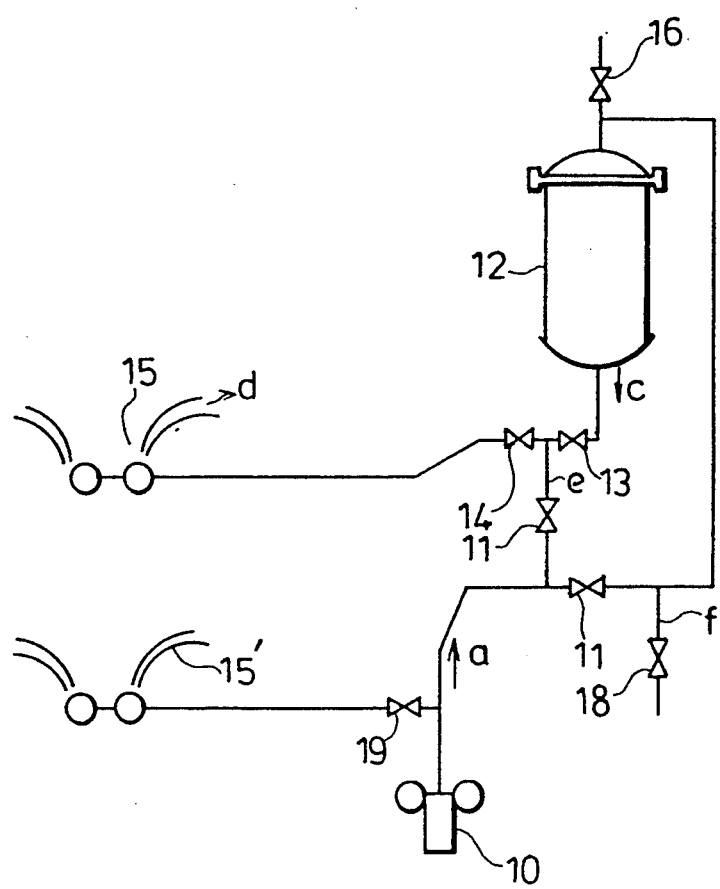
FIG. 3 is a schematic flow diagram of the second preferred embodiment of a circulating filter and aerator system according to the present invention.

Referring to FIG. 3, the second preferred embodiment of a filter and aerator system according to the present invention is shown to further comprise a seventh control valve 19 which is disposed between the first control valve 11 and the pump unit 10, and a second floating aerator unit 15' which is connected to the pump unit 10 via the seventh control valve 19. As long as the water quality is good, the first and fifth control valves 11, 17 can be closed, thereby permitting water from the pump unit 10 to flow directly to the second floating aerator unit 15'. It is also possible to open the seventh control valve 19 partially while the first control valve 11 is maintained open to effect a partial water filtering operation.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements. For example, the described filter and aerator system can be operated manually or can be incorporated into a semi-automatic or fully automatic operation by the use of automatic control valves, timers, computers, etc. Furthermore, a fully automatic valve unit can be used to replace most or all of the control valves while still achieving the intended functions of the present invention.

I claim:

1. A circulating filter and aerator system to be installed in a pond of an aquaculture system, comprising:
    a floatable pump unit for drawing water from the pond;
    means for positioning said pump unit at predetermined depths in the pond;
    a filter unit with an inlet port and an outlet port;
    a first control valve connecting said pump unit and said inlet port of said filter unit and controlling water flow from said pump unit to said filter unit;
    a first floatable aerator unit receiving filtered water from said filter unit and generating sprays of said filtered water to release harmful gas and to reintroduce oxygen to the pond;
    serially connected second and third control valves connecting said outlet port of said filter unit and said first floatable aerator unit and controlling water flow from said filter unit to said first floatable aerator unit;
    a fourth control valve provided on said filter unit to permit release of air in said filter unit when water fills said filter unit;
    a fifth control valve provided between said outlet port of said filter unit and said pump unit; and
    a sixth control valve provided between said first control valve and said inlet port of said filter unit.

2. The circulating filter and aerator system as claimed in claim 1, wherein said fifth control valve connects a junction of said second and third control valves and said pump unit.

3. The circulating filter and aerator system as claimed in claim 2, further comprising a seventh control valve which is disposed between said first control valve and said pump unit, and a second floating aerator unit which is connected to said pump unit via said seventh control valve.

4. The circulating filter and aerator system of claim 1 including a structural member to which the floatable pump unit and the filter unit are integrally affixed.

5. A circulating filter and aerator system to be installed in a pond of an aquaculture system, comprising:
    a floatable pump for drawing water from the pond;
    means for positioning said pump at predetermined depths beneath the water surface of the pond;
    a filter connected to said pump for filtering said filter defining means for removing plankton, algae, and other contaminants from said water drawn from the pond; and
    a floatable aerator connected to said filter for receiving filtered water from said filter and for generating sprays of the filtered water to release harmful gas and to reintroduce oxygen to the pond;
    wherein the pressure generated by said pump is sufficient to drive the water through said filter and said floatable aerator.

6. The circulating filter and aerator system of claim 5 including a structural member to which the floatable pump and the filter are integrally affixed.

* * * * *

UNITED STATES PATENT AND TRADEMARK OFFICE
CERTIFICATE OF CORRECTION

PATENT NO. : 5,397,466
DATED : March 14, 1995
INVENTOR(S) : Victor J. LIN

It is certified that error appears in the above-indentified patent and that said Letters Patent is hereby corrected as shown below:

Title page, item: [73] Assignee, change "Taipei, Taiwan, Prov. of China" to --Taipei City, Taiwan--.

Signed and Sealed this

Twentieth Day of June, 1995

Attest:

BRUCE LEHMAN

Attesting Officer   Commissioner of Patents and Trademarks